United States Patent
Li et al.

(10) Patent No.: US 10,928,498 B1
(45) Date of Patent: Feb. 23, 2021

(54) ELECTRONIC DEVICE WITH CIRCULAR RADAR-ANTENNA ARRAY

(71) Applicant: Apple Inc., Cupertino, CA (US)

(72) Inventors: Chunshu Li, San Jose, CA (US); Jouya Jadidian, Saratoga, CA (US); Mikheil Tsiklauri, Cupertino, CA (US); Vaneet Pathak, Los Altos, CA (US)

(73) Assignee: Apple Inc., Cupertino, CA (US)

(*) Notice: Subject to any disclaimer, the term of this patent is extended or adjusted under 35 U.S.C. 154(b) by 231 days.

(21) Appl. No.: 16/134,029

(22) Filed: Sep. 18, 2018

(51) Int. Cl.
  *G01S 13/42* (2006.01)
  *G01S 13/87* (2006.01)
  *H04B 17/10* (2015.01)

(52) U.S. Cl.
  CPC .......... *G01S 13/42* (2013.01); *G01S 13/87* (2013.01); *H04B 17/104* (2015.01)

(58) Field of Classification Search
  CPC ........ G01S 13/42; G01S 13/87; H04B 17/104
  USPC .......................................................... 342/59
  See application file for complete search history.

(56) References Cited

U.S. PATENT DOCUMENTS

| | | | |
|---|---|---|---|
| 6,215,294 B1* | 4/2001 | Coleman | G01R 29/0842 324/72 |
| 6,292,130 B1* | 9/2001 | Cavallaro | A63B 24/0021 342/104 |
| 8,018,374 B2* | 9/2011 | Imai | G01S 7/03 342/135 |
| 8,085,199 B2 | 12/2011 | Grau Besoli | |
| 9,116,232 B2 | 8/2015 | Goel | |
| 9,287,620 B2 | 3/2016 | McGowan | |
| 9,529,082 B1* | 12/2016 | Rikoski | G01S 7/52004 |
| 9,864,042 B2 | 1/2018 | Pandey | |
| 2005/0003737 A1* | 1/2005 | Montierth | A61B 8/546 451/5 |
| 2010/0220001 A1* | 9/2010 | Longstaff | G01S 13/003 342/22 |
| 2012/0188125 A1* | 7/2012 | Pomietlasz | G01S 13/87 342/357.68 |
| 2014/0341261 A1* | 11/2014 | Weiler | H04B 1/44 375/219 |
| 2015/0070241 A1* | 3/2015 | Howard | H01Q 21/205 343/853 |
| 2016/0178583 A1* | 6/2016 | Ntziachristos | G01N 29/2412 73/643 |

(Continued)

*Primary Examiner* — Frank J McGue
(74) *Attorney, Agent, or Firm* — Kowert, Hood, Munyon, Rankin & Goetzel, P.C.

(57) ABSTRACT

An electronic device includes M separate radar transmitters and N separate radar receivers co-located in the electronic device, where the M radar transmitters and the N radar receivers are arranged in a circular architecture providing 360° coverage in a horizontal plane. Moreover, the N radar receivers are synchronized, e.g., using a clock signal. During operation, subsets of the M radar transmitters sequentially transmit radar signals and, when a given subset of the M radar transmitters is transmitting, at least a subset of the N radar receivers performs radar measurements. Furthermore, at least the subset of the N radar receivers can perform the radar measurements using circular beamforming. Based at least in part on the radar measurements, the electronic device determines a location of an object in an environment around the electronic device, where the location includes a range and an angular position.

20 Claims, 11 Drawing Sheets

(56) References Cited

U.S. PATENT DOCUMENTS

2017/0254880 A1* 9/2017 Smith ..................... G01S 13/86
2018/0031689 A1   2/2018 Ben-Ari
2019/0196062 A1* 6/2019 Coleman ................. G01W 1/16
2019/0317217 A1* 10/2019 Day ........................ G01S 17/58
2020/0284883 A1* 9/2020 Ferreira ................. G01S 7/4816

* cited by examiner

ELECTRONIC DEVICE WITH CIRCULAR RADAR-ANTENNA ARRAY

FIELD

The described embodiments relate, generally, to radar measurements by an electronic device, and techniques for performing radar measurements using an electronic device having an array of radar transmit antennas and receive antennas with a 360° field of view.

BACKGROUND

Ideally, a user interface for an electronic device requires little or no advanced knowledge by a user or training for proper operation. Moreover, the user interface should be tailored to a user's preferences and their mental model of a task. These attributes help ensure that the user interface is intuitive and easy to use, which improves user efficiency and customer satisfaction.

However, many existing user interfaces in electronic devices do not achieve these ideals. Consequently, these existing user interfaces can be cumbersome and difficult for users to interact with effectively.

For example, based on advances in speech recognition, many electronic devices now include voice user interfaces. A voice user interface allows a user to control and, more generally, interact with an electronic device by simply speaking with it.

Many voice user interfaces are based, at least in part, on predefined keywords or commands, such as a wake word that is used to activate an electronic device. Users may need to memorize the predefined keywords or commands, which can increase the time required to become proficient in system operations.

Furthermore, accurately identifying a user of the voice user interface is often challenging, which may make it more difficult to accurately customize a voice user interface to the preferences and needs of a particular user.

SUMMARY

An electronic device that performs radar measurements is described. This electronic device includes M radar transmitters and N radar receivers that are co-located in the electronic device, where the M radar transmitters and N radar receiver are arranged in a circular architecture that provides 360° coverage in a horizontal plane, and where M and N are integers. During operation, subsets of the M radar transmitters sequentially transmit radar signals and, when a given subset of the M radar transmitters is transmitting, at least a subset of the N radar receivers performs radar measurements, wherein the subset of the radar transmitters is synchronized using one or more clock signals. Furthermore, at least the subset of the N radar receivers can perform the radar measurements using circular beamforming. Based at least in part on the radar measurements, the electronic device determines a location of an object in an environment around the electronic device, where the location includes a range and an angular position.

Moreover, the N radar receivers may have fixed fields of view that at least partially overlap to provide the 360° coverage.

Furthermore, the M radar transmitters and the N radar receivers may have fixed antenna patterns.

In some embodiments, during operation, the electronic device interpolates between the radar measurements performed by at least the subset of the N radar receivers and/or removes at least a portion of the radar measurements that are associated with one or more static objects in the environment.

Note that a number of radar receivers in at least the subset of the N radar receivers used to perform the radar measurements may be dynamically adapted.

Moreover, the M radar transmitters may vertically polarize or circularly polarize the radar signals.

Furthermore, the electronic device may include at least one of a top radar transmitter and a top radar receiver that have fields of view above the electronic device and/or a bottom radar transmitter and a bottom radar receiver that have fields of view that are below the electronic device. During operation, the top radar transmitter and/or the bottom radar transmitter may transmit additional radar signals and the top radar receiver and/or the bottom radar receiver may perform additional radar measurements. Then, based at least in part on the additional radar measurements, the electronic device may determine a vertical dimension of the environment.

Additionally, portions of the M radar transmitters and portions of the N radar receivers may be arranged in different horizontal planes.

In some embodiments, during operation, the electronic device detects a surface proximate to the electronic device and disables one or more of the M radar transmitters having a field of view that include the surface.

Note that the radar signals may be delayed in the electronic device so that a near field of the M radar transmitters is not determined by a pulse width of the radar signals.

Moreover, in some embodiments, M may equal four, eight or 16, and N may equal 16.

Note that the object may include or be an individual. Moreover, the electronic device may identify the individual based at least in part on the radar measurements. Identifying the individual can include determining a specific identity of the individual or determining an identifying attribute or characteristic of the individual. Furthermore, based at least in part on the radar measurements, the electronic device may determine at least one of a vital sign of the individual and/or a medical condition of the individual.

Additionally, the electronic device may determine one or more horizontal dimensions of the environment or an orientation of the electronic device in the environment based at least in part on the radar measurements. Alternatively or additionally, based at least in part on the radar measurements, the electronic device may determine at least one of an acoustic property of the object in the environment or an acoustic property of the environment.

In some embodiments, the transmitted radar signals include pulsed radar signals and/or continuous-wave radar signals. The transmitted radar signals may allow the electronic device to determine the location when the object is static or moving in the environment.

Moreover, the angular position of the object may have a predefined or consistent resolution over the 360° coverage.

Furthermore, the given subset of the M radar transmitters includes one radar transmitter. Alternatively, the given subset of the M radar transmitters includes a pair of radar transmitters located on opposite sides of the circular architecture.

In some embodiments, the electronic device includes multiple radar transceivers, and the M radar transmitters include M transmit antennas that are coupled to the radar transceivers, and the N radar receivers include N receive antennas that are coupled to the radar transceivers. However, in other embodiments the M radar transmitters include one or more first radar transceivers and M transmit antennas, and the N radar receivers include one or more second radar transceivers and N radar antennas.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for determining a location of an object. The method includes at least some of the aforementioned operations performed by the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
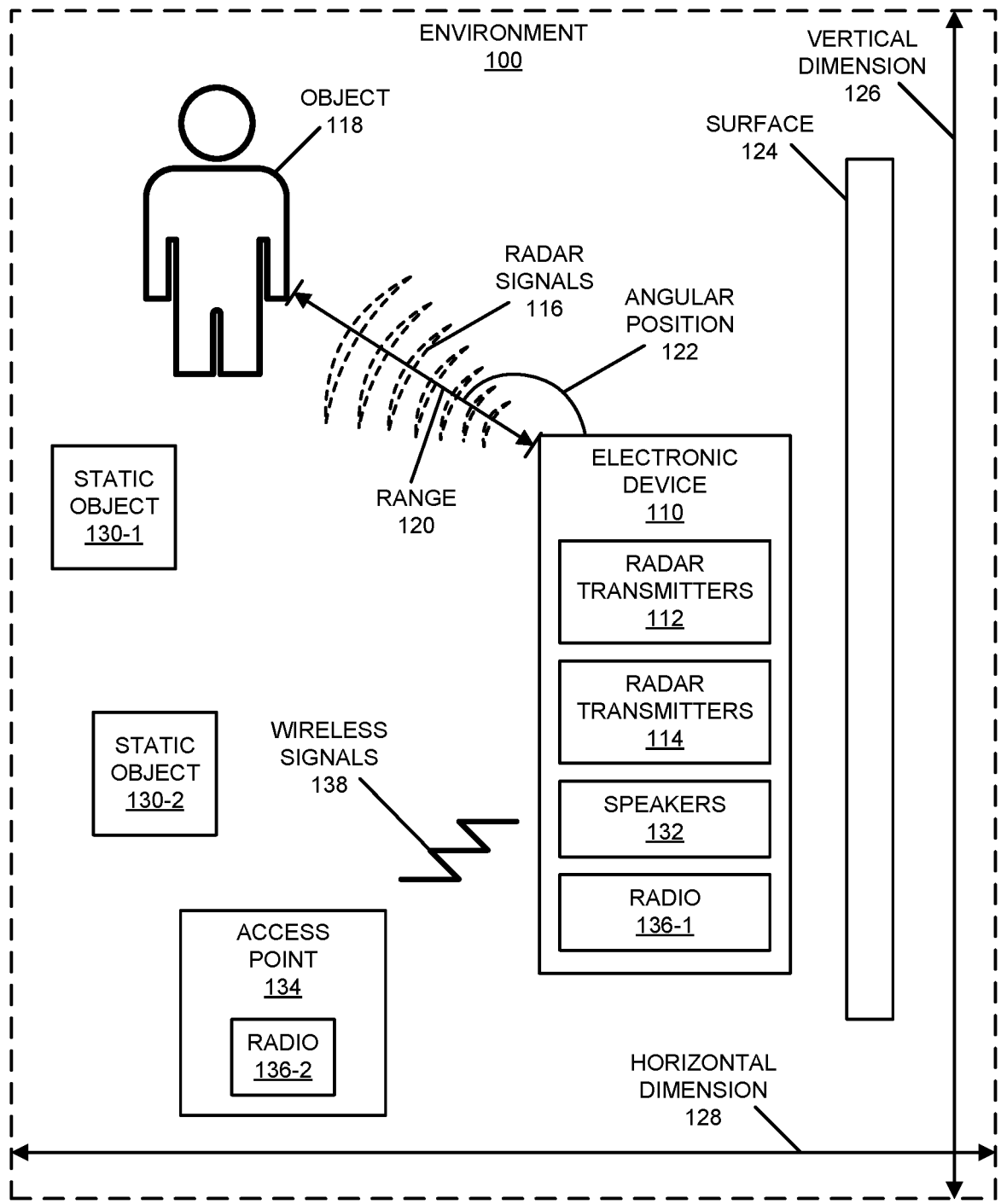
FIG. 1 is a block diagram illustrating an example of an electronic device performing radar measurements.

An electronic device that performs radar measurements is described. This electronic device includes M separate radar transmitters and N separate radar receivers that are co-located in the electronic device, where the M radar transmitters and the N radar receivers are arranged in a circular architecture that provides 360° coverage in a horizontal plane, and where M and N are integers. Moreover, the N radar receivers can be synchronized using a clock signal. During operation, subsets of the M radar transmitters sequentially transmit radar signals and, when a given subset of the M radar transmitters is transmitting, at least a subset of the N radar receivers performs radar measurements. Furthermore, at least the subset of the N radar receivers can perform the radar measurements using circular beamforming. Based at least in part on the radar measurements, the electronic device determines a location of an object in an environment around the electronic device, where the location includes a range and an angular position. Note that the object may be an individual. Identifying the individual can include determining a specific identity of the individual or determining an identifying attribute or characteristic of the individual. The electronic device may identify the individual based at least in part on the radar measurements.

By determining the location and/or the identity of the individual, the measurement techniques may facilitate improved operation of the electronic device. For example, these capabilities may allow the electronic device to continuously, or periodically, monitor the environment and/or the individual, including any commands provided by the individual (such as spoken commands and/or gestures). Thus, the capabilities of the electronic device may facilitate a user interface that responds to the individual without requiring that the individual memorize predefined keywords or commands. Moreover, based at least in part on the identity of the individual, the user interface may be customized using their preferences and/or needs. Consequently, the electronic device may provide a user interface that requires little or no advanced knowledge by the individual or training for proper operation, and that can be customized or tailored. Therefore, the electronic device may be intuitive and easy to use, which can improve user efficiency and customer satisfaction.

In the discussion that follows, the electronic device performs the radar measurements using radar signals in one or more bands of frequencies. For example, the radar signals may have one or more carrier or fundamental frequencies between 5-10 GHz. More generally, the radar signals may have one or more carrier or fundamental frequencies between 300 MHz and 100 GHz. For example, the radar signals may have fundamental frequencies between 2.5 GHz (which penetrate clothing and tissue) and 60 GHz (which is largely blocked or reflected by the human body). In some embodiments, the radar signals may include or may be compatible with ultra-wideband (which is sometimes referred to as UWB or 'pulse radio').

Note that the measurement techniques may be used in conjunction with one or more other wireless ranging or location techniques in accordance with a communication protocol, such as a communication protocol that is compatible with an IEEE 802.11 standard (which is sometimes referred to as Wi-Fi). In some embodiments, the measurement techniques can be used with IEEE 802.11BA and/or IEEE 802.11ax. However, the measurement techniques may also be used with a wide variety of other communication protocols, and in electronic devices (such as portable electronic devices or mobile devices) that can incorporate multiple different radio access technologies (RATs) to provide connections through different wireless networks that offer different location-based services and/or capabilities.

Therefore, the electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes peer-to-peer communication techniques.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point.

Additionally, it should be understood that, in some embodiments, the electronic devices described herein may be configured as multi-mode wireless communication devices that are also capable of communicating via different 3G and/or second generation (2G) RATs. In these scenarios, a multimode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of an electronic device that performs radar measurements. Notably, electronic device 110 (such as a smartphone, a laptop computer, a notebook computer, a tablet, a wireless speaker, an IoT device, a smart appliance, a set-top box, a security device, or another such electronic device) may include M separate radar transmitters 112 and N separate radar receivers 114 that are co-located in electronic device 110. In some embodiments, the M radar transmitters 112 and the N radar receivers 114 may be arranged in a circular architecture that provides 360° coverage in a horizontal plane, and where M and N are integers. In other embodiments, other shapes or arrangements can be used for the layout of the radar transmitters 112 and radar receivers 114, such as a different ellipse, triangular, rectangular, multiple curves, other geometric shapes, etc. At a given time, at least a subset of the M radar transmitters 112 may transmit radar signals 116 and at least a subset of the N radar receivers performs the radar measurements on the returned or the reflected radar signals. Then, based at least in part on the radar measurements performed by at least a subset of the N radar receivers 114, electronic device 100 may determine a location of an object 118 (such as an individual, furniture, a wall or boundary, etc.) in an environment 100 (such as a room) that includes electronic device 110. Note that the location may include a range 120 or distance to object 118 and/or an angular position 122 of object 118.

As described further below with reference to FIGS. 2-9, the N radar receivers 114 may be synchronized with each other, e.g., using one or more clock signals. For example, the one or more clock signals may have a fundamental frequency of 240 MHz, and at least the subset of the N radar receivers 114 may be synchronized to a rising or a falling edge of the one or more clock signals. Note that a transmitter that is currently transmitting may act as a master to the other transmitters and/or receivers. Consequently, the location of object 118 may be determined using circular beamforming (and, thus, using phase or timing information). Note that angular position 122 of object 118 may have a predefined or consistent resolution over the 360° coverage.

Moreover, as described further below with reference to FIGS. 6-9, the N radar receivers 114 may have fixed fields of view that at least partially overlap. Together, the N radar receivers 114 provide the 360° coverage. Note that M may, e.g., equal four, eight or 16, and N may, e.g., equal 16. However, any other numbers of transmitters and receivers can be used. Furthermore, a number of radar receivers in at least the subset of the N radar receivers 114 used to perform the radar measurements may be dynamically adapted. In some embodiments, the given subset of the M radar transmitters 112 includes one radar transmitter. Moreover, in some other embodiments, the given subset of the M radar transmitters 112 includes a pair of radar transmitters located on opposite sides of the circular architecture. In still other embodiments, a subset also can include at least one but not transmitters or at least one but not all receivers, respectively.

In some embodiments, electronic device 100 detects a surface 124 proximate to electronic device 100 and disables one or more of the M radar transmitters 112 having fields of view that include surface 124. Similarly, if an accelerometer or a gyroscope in electronic device 100 detects that electronic device 100 has moved, the calibration of environment 100 may be repeated.

Furthermore, as described further below with reference to FIG. 11, portions of the M radar transmitters 112 and/or portions of the N radar receivers 114 may be arranged in different horizontal planes.

Additionally, as described further below with reference to FIG. 10, electronic device 100 may include at least one of a top radar transmitter in radar transmitters 112 and a top radar receiver in radar receivers 114 that have fields of view above electronic device 100. Additionally or alternatively, electronic device 100 may include at least a bottom radar transmitter in radar transmitters 112 and a bottom radar receiver in radar receivers 114 that have fields of view that are below electronic device 100. During operation, the top radar transmitter and/or the bottom radar transmitter may transmit additional radar signals and the top radar receiver and/or the bottom radar receiver may perform additional radar measurements. Then, based at least in part on the additional radar measurements, electronic device 100 may determine a vertical dimension 126 of environment 100.

Note that the M radar transmitters 112 and the N radar receivers 114 may have fixed antenna patterns. Moreover, the M radar transmitters 112 may vertically polarize or circularly polarize the radar signals 116.

Furthermore, electronic device 110 may identify object 118 (such as the identity of an individual) based at least in part on one or more of the radar measurements. Identifying the individual can include determining a specific identity of the individual or determining an identifying attribute or characteristic of the individual. Additionally, based at least in part on the radar measurements, electronic device 110 may determine at least one of a vital sign of the individual and/or a medical condition of the individual. In some embodiments, electronic device 110 determines, based at least in part on the radar measurements, one or more dimensions of environment 100 (such as a horizontal dimension 128), an acoustic property of object 118 or environment 100 (such as absorption or a reverberation time), and/or an orientation of electronic device 110 in environment 100.

Additionally, during operations, electronic device 100 may interpolate between the radar measurements performed by at least the subset of the N radar receivers 112 and/or may remove at least a portion of the radar measurements that are associated with one or more static objects 130 in environment 100.

In some embodiments, the transmitted radar signals 116 include pulsed radar signals and/or continuous-wave radar signals. Note that radar signals 116 may be delayed in electronic device 100 so that a near field of the M radar transmitters 112 is not determined by a pulse width of radar signals 116.

Furthermore, as described further below with reference to FIG. 6-9, electronic device 100 may include multiple radar transceivers, and the M radar transmitters 112 may include M transmit antennas that are coupled to the radar transceivers, and the N radar receivers 114 may include N receive antennas that are coupled to the radar transceivers. However, in other embodiments the M radar transmitters 112 include one or more first radar transceivers and M transmit antennas, and the N radar receivers 114 include one or more second radar transceivers and N radar antennas. Thus, the measurement techniques may use either distributed transmitters and receivers, or may multiplex central processing to transmit antennas and receive antennas. In embodiments with central processing by one or more shared radar transceivers, a radar receiver may include a differential amplifier that provides the difference of received radio-frequency or radar signals to one or more of the shared radar transceivers.

In these ways, the measurement techniques may allow electronic device 110 to determine the location of object 118, including when object 118 is moving and/or static in environment 100. Moreover, by identifying the individual, the measurement techniques may facilitate an improved user interface for controlling electronic device 110. For example, based at least in part on their identity, the individual may be automatically authorized to control electronic device 110 or have access to particular content through electronic device 110. Furthermore, stored user preferences and/or historical actions of the identified individual may be accessed, so that electronic device 110 may automatically provide a user experience that is customized to the individual. Additionally, based at least in part on the determined location, electronic device 110 may directionally listen for spoken commands from the individual or may be able to determine when the individual is providing a command for electronic device 110 (e.g., by detecting a gesture or using the measured radar signals). This may allow the individual to control electronic device 110 without using keywords, such as a wake word to activate electronic device. Instead, electronic device 110 may provide an ever-present sensing capability. In some embodiments, the determined vital sign or the medical condition of the individual facilitates an additional service or application. Alternatively or additionally, the determined dimension(s), acoustic property and/or orientation may allow sound (such as a sound field) output by speakers 132 in or associated with electronic device 110 to be tailored or customized to conditions in environment 100. These capabilities may improve the user experience when using electronic device 110.

In some embodiments, electronic device 110 (such as a smartphone, a laptop computer, a notebook computer, a tablet, a wireless speaker, an IoT device, a smart appliance, a set-top box, a security device, or another such electronic device) and access point 134 may communicate wirelessly in a WLAN using an IEEE 802.11 communication protocol. Thus, electronic device 110 may be associated with access point 134. For example, electronic device 110 and access point 134 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 134 may provide access to a network, such as the Internet, via an Ethernet protocol, and may be a physical access point or a virtual or 'software' access point that is implemented on a computer or an electronic device.

Figure 12:
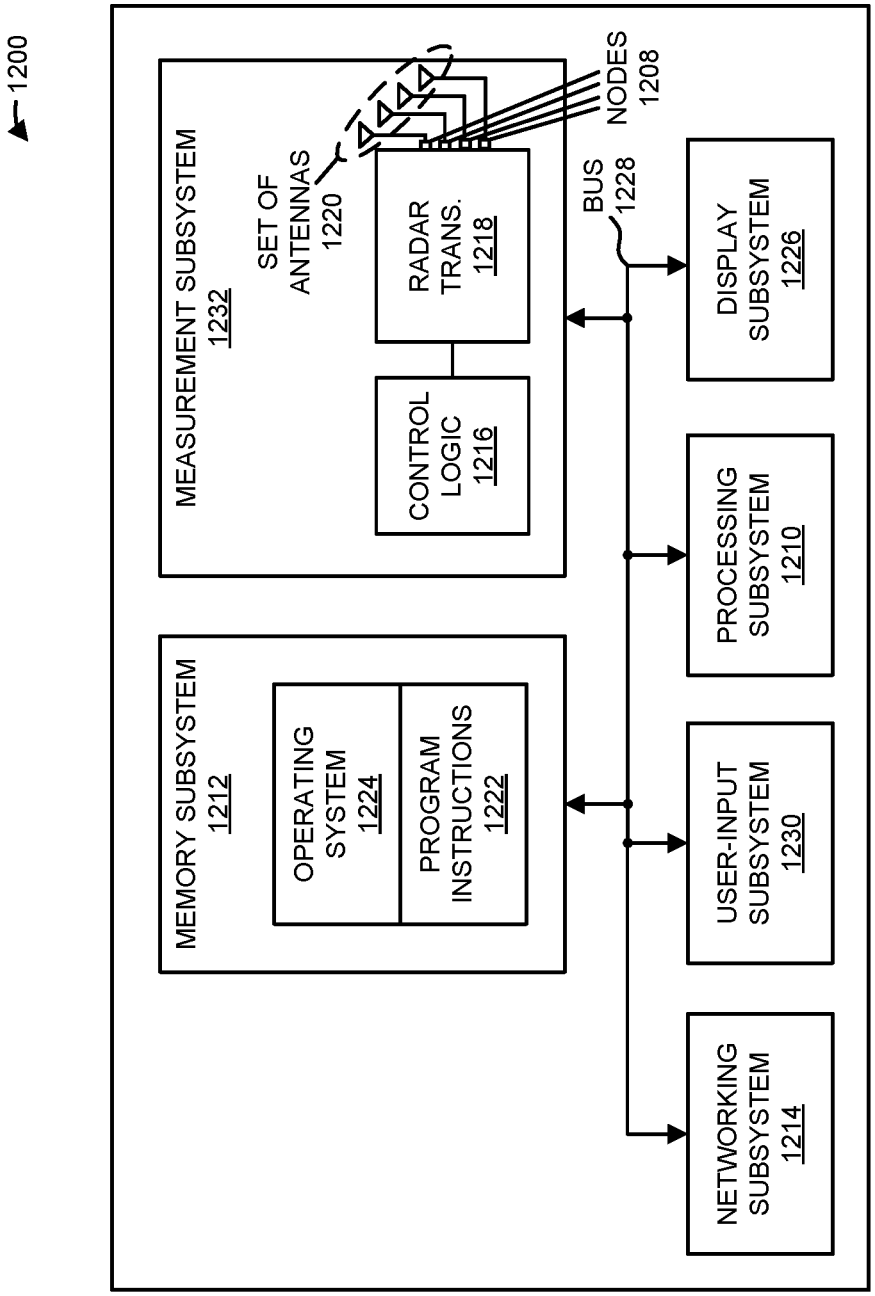
FIG. 12 is a block diagram illustrating an example of the electronic device of FIG. 1.

As described further below with reference to FIG. 12, electronic device 110 and/or access point 134 may include subsystems, such as a networking subsystem, a memory subsystem, a processor subsystem and a measurement subsystem. In general, electronic device 110 may include any electronic device with a measurement subsystem that enables electronic device 110 to perform radar measurements. In addition, electronic device 110 and/or access point 134 may include radios 136 in the networking subsystems. In some embodiments, electronic device 110 and access point 134 can include (or can be included within) any electronic devices with networking subsystems that enable electronic device 110 and access point 134, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 138 (represented by a jagged line) are communicated by radios 136-1 and 136-2 in electronic device 110 and access point 134, respectively. For example, as noted previously, electronic device 110 and access point 134 may exchange packets using a Wi-Fi communication protocol in a WLAN. In some embodiments, radio 136-1 may receive wireless signals 138 that are transmitted by radio 136-2. Alternatively, radio 136-1 may transmit wireless signals 138 that are received by radio 136-2.

Note that access point 134 and electronic device 110 may be compatible with an IEEE 802.11 standard that includes trigger-based channel access (such as IEEE 802.11ax). However, access point 134 and electronic device 110 may also communicate with one or more legacy electronic devices that are not compatible with the IEEE 802.11 standard (e.g., that do not use multi-user trigger-based channel access). In some embodiments, electronic device 110 uses multi-user transmission (such as orthogonal frequency division multiple access or OFDMA). For example, radio 136-2 may provide a trigger frame for one or more electronic devices. Moreover, after radio 136-1 receives a trigger frame, radio 136-1 may provide a group acknowledgment to radio 136-2. For example, radio 136-1 may provide the acknowledgment during an assigned time slot and/or in an assigned channel in the group acknowledgment. However, in some embodiments the one or more electronic devices may individually provide acknowledgments to radio 136-2. Thus, after radio 136-1 receives the trigger frame, radios (such as radio 136-1) in the one or more electronic devices) may provide an acknowledgment to radio 136-2.

In the described embodiments, processing a packet or frame in electronic device 110 and access point 134 includes: receiving wireless signals 138 encoding a packet or a frame; decoding/extracting the packet or frame from received wireless signals 138 to acquire the packet or frame; and processing the packet or frame to determine information contained in the packet or frame (such as data in the payload).

In general, the communication via the WLAN in the measurement techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, different electronic devices may be transmitting and/or receiving radar signals.

Figure 2:
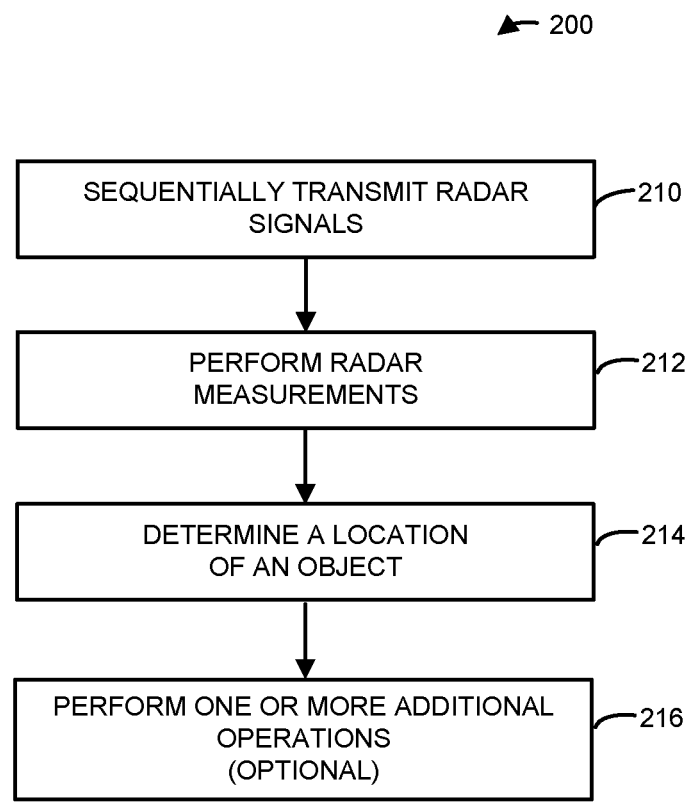
FIG. 2 is a flow diagram illustrating an example of a method for determining a location of an object using the electronic device in FIG. 1.

FIG. 2 presents a flow diagram illustrating an example method 200 for determining a location of an object. This method may be performed by an electronic device, such as electronic device 110 in FIG. 1. The electronic device may include M separate radar transmitter and N separate radar receivers that are co-located in the electronic device. During operation, the electronic device may sequentially transmit radar signals (operation 210) using subsets of the M radar transmitters, where the M radar transmitters and the N radar receivers are arranged in a circular architecture that provides 360° coverage in a horizontal plane, and where M and N are integers. Then, the electronic device may perform radar measurements (operation 212) using the N radar receivers, where the N radar receivers are synchronized, e.g., using a clock signal, and where, when a given subset of the M radar transmitters is transmitting, at least a subset of the N radar receivers performs the radar measurements. Moreover, at least the subset of the N radar receivers can perform the radar measurements using circular beamforming. Next, the electronic device determines the location of the object (operation 214) in an environment around the electronic device based at least in part on the radar measurements, where the location includes a range and an angular position. For example, the electronic device may determine a two-dimensional (2D) map of the location, which may allow motion of the object to be assessed as a function of time.

In some embodiments, the electronic device optionally performs one or more operations (operation 216). Notably, the object may include an individual, and the electronic device may identify the individual based at least in part on the radar measurements. In some instances, the individual may be identified specifically (e.g., the identity of the person is determined). In other instances, the individual may be identified generally, e.g., as a person, an adult/child, guest, etc., based at least in part on an identifying attribute or characteristic of the individual. For example, the individual may be identified based at least in part on a unique characteristic, such as any/all of their gait or step size, physical profile, height, etc. Alternatively or additionally, an object may be identified as a human based at least in part on characterization of the environment, such as motion of the object through a previously identified door or window in the environment. Note that, in some embodiments, the individual may be identified based at least in part on speech recognition. Furthermore, based at least in part on the radar measurements, the electronic device may determine at least one of a vital sign of the individual and/or a medical condition of the individual.

Moreover, the electronic device may interpolate between the radar measurements performed by at least the subset of the N radar receivers and/or remove at least a portion of the radar measurements that are associated with one or more static objects in the environment.

Furthermore, the electronic device may dynamically adapt a number of radar receivers in at least the subset of the N radar receivers used to perform the radar measurements. For example, the number of radar receivers may be adapted when there is an individual in the environment.

In some embodiments, the electronic device may detect a surface proximate to the electronic device. In response, the electronic device may disable one or more of the M radar transmitters having fields of view that include the surface. Alternatively or additionally, if the electronic device detects that it has been moved or that its orientation has changed, the electronic device may repeat calibration of the environment. This may allow the electronic device to detect whether there is a surface proximate to the electronic device.

Additionally, the electronic device may determine, based at least in part on the radar measurements, one or more horizontal dimensions of the environment and/or an orientation of the electronic device in the environment. In some embodiments, the electronic device includes at least one of a top radar transmitter and a top radar receiver or a bottom radar transmitter and a bottom radar receiver, which, respectively, have fields of view above or below the electronic device. The electronic device may transmit additional radar signals using the top radar transmitter and/or the bottom radar transmitter. Then, the electronic device may perform additional radar measurements using the top radar receiver and/or the bottom radar receiver. Next, the electronic device may determine a vertical dimension of the environment based at least in part on the additional radar measurements.

Moreover, based at least in part on the radar measurements, the electronic device may determine an acoustic property of the object in the environment and/or an acoustic property of the environment.

Furthermore, the transmitted radar signals may include pulsed radar signals and (e.g., frequency modulated) continuous-wave radar signals. The transmitted radar signals may allow the electronic device to determine the location when the object is static or moving in the environment. Moreover, the pulsed radar signals may offer low power consumption (with a range resolution of, e.g., 5 cm, less than 5 cm, 5-10 cm, etc.), and the continuous-wave radar signals may provide rich Doppler measurements (with a range resolution of, e.g., a fraction of a centimeter). Thus, the range resolution in the radar measurements may be, e.g., between 1-10 cm. Note that a duration of the pulsed radar signals may be, e.g., 1 ns, which may, at least in part, determine a near-field resolution of the electronic device. However, the electronic device may delay the radar signals so that a near field of the M radar transmitters is not determined by a pulse width or the duration of the pulsed radar signals. For example, the electronic device may calibrate internal delays of electrical signals, and may use the delays to delay radio-frequency signals so that the near field is not determined by the pulse width or duration. Additionally, a maximum range of the radar signals may be, e.g., 10-20 m, and a latency of the radar signals may correspond to, e.g., a 25 ms/radar frame. Additionally, the carrier frequency of the radar signals may be configurable between, e.g., 6 and 10 GHz, and a transmit or a receive antenna for a given radar transceiver may have an area of, e.g., 12×14 mm$^2$ (however, other antenna sizes can be used).

Note that the identity of the individual and their location history may be used by the electronic device when determining the location. Moreover, the location of the individual may be determined by the electronic device in real time. In some embodiments, the determined location of the individual is provided with up to a 500 ms delay, which may not be perceivable by a user of the electronic device.

Moreover, in some embodiments, the radar signals are restricted to the environment (e.g., based on the carrier frequency of the radar signals). Consequently, the radar signals may not penetrate walls or boundaries between, e.g., different rooms. In addition to eliminating or reducing multi-path signals, this constraint may help protect the privacy of other individuals who are not located in the environment.

In some embodiments of method 200, there may be additional or fewer operations. Further, one or more different operations may be included. Moreover, the order of the operations may be changed, and/or two or more operations may be combined into a single operation or performed at least partially in parallel.

Figure 3:
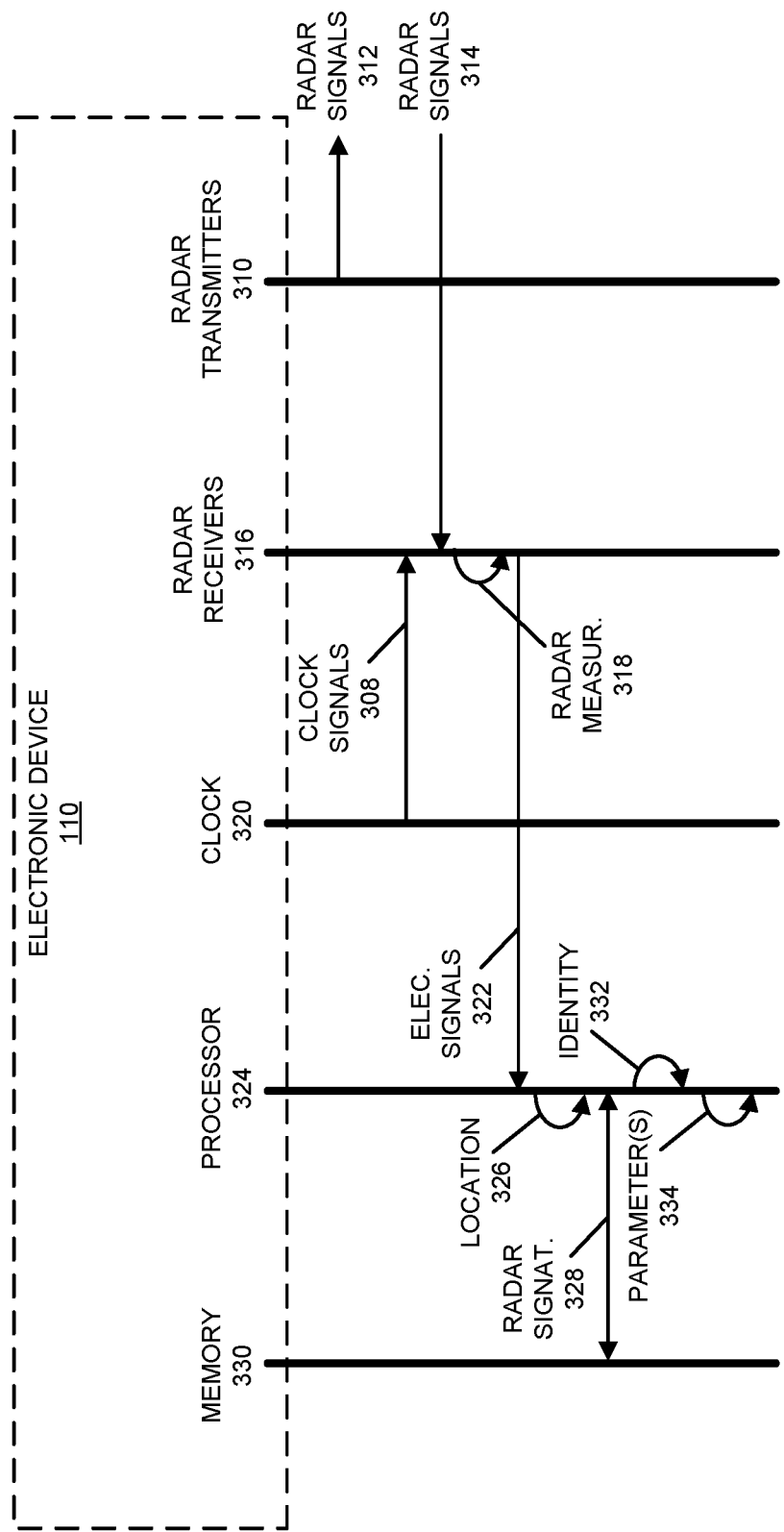
FIG. 3 is a flow diagram illustrating an example of communication among components in the electronic device of FIG. 1.

The measurement techniques are further illustrated in FIG. 3, which presents a flow diagram illustrating an example of communication among components in electronic device 110. During operation, subsets of M separate radar transmitters 310 co-located in electronic device 110 may sequentially transmit radar signals 312. Note that the transmitted radar signals 312 may include pulsed radar signals and/or continuous-wave radar signals.

Subsequently, N separate radar receivers 316 may perform radar measurements 318 of reflected or returned radar signals 314. Note that radar receivers 316 may be synchronized with each other, e.g., using one or more clock signals 308 provided by clock 320. Moreover, when a given subset of the M radar transmitters 310 is transmitting, at least a subset of the N radar receivers 316 performs the radar measurements 318, and at least the subset of the N radar receivers 316 performs the radar measurements 318 using circular beamforming.

After performing these radar measurements, the N radar receivers 316 may provide electrical signals 322 corresponding to radar measurements 318 to processor 324.

Next, processor 324 may determine a location 326 (including a range and an angular position) of an object in an environment that includes electronic device 110 based at least in part on radar measurements 318.

Moreover, processor 324 may access one or more radar signatures 328 stored in memory 330 in electronic device 110, and may use the one or more radar signatures 328 to identify 332 an individual based at least in part on radar measurements 318 (as specified by electrical signals 322). For example, processor 324 may compare radar measurements 318 and the one or more radar signatures 328 to determine one or more match scores, and the identity may be determined based on one of the one or more match scores (such as a best or maximum match score).

Furthermore, processor 324 may determine one or more additional parameters 334 based at least in part on radar measurements 318 (as specified by electrical signals 322). For example, processor 324 may determine a vital sign of the individual (such as a pulse, a blood pressure, or a respiration rate of the individual) and/or a medical condition of the individual (such as a medical emergency, a disease, a physical symptom, such as a tremor, a physical condition, e.g., dementia based at least in part on a gait of the individual, etc.). Alternatively or additionally, the one or more additional parameters 334 may include: one or more dimensions of the environment. In some embodiments, the one or more additional parameters 334 includes an acoustic property of the object in the environment or of the environment. For example, processor 324 may access a look-up table, stored in memory 330, with acoustic properties of different materials and/or objects as a function of radar measurements. Using this look-up table, processor 324 may use radar measurements 318 (as specified by electrical signals 322) to determine the acoustic property.

While communication between the components in FIG. 3 is illustrated with unilateral or bilateral communication (e.g., lines having a single arrow or dual arrows), in general a given communication operation may be unilateral or bilateral.

The measurement techniques may provide centimeter-accurate, low-cost, low-power user localization using M separate radar transmitters and N separate radar receivers, which may be co-located in the electronic device. Notably, the measurement techniques may be used by an electronic device to determine the location of an individual (and, more generally, an object) in a confined space or environment. In order to do so, the electronic device may need to distinguish the individual from one or more static objects in the environment. Moreover, the measurement techniques may include one or more operations to remove artifacts, such as: interpolating between the radar measurements performed by at least the subset of the N radar receivers, and/or removing at least a portion of the radar measurements that are associated with one or more static objects in the environment. In some embodiments, the measurement techniques may be used to determine dimensions of the environment and/or a relative orientation of the electronic device in the environment.

Many image-based localization techniques can be: power intensive, relatively expensive, and/or require light illumination. Image-based localization techniques also may raise privacy issues, can be sensitive to obstruction, may provide less accurate range information, and/or may have a significant impact on the form factor. For example, LIDAR-based systems can be expensive and power intensive, can be sensitive to obstruction, and may occupy a relatively large space. Similarly, many ultrasound-based systems can consume relatively large amounts of power, can be prone to interference, and can be sensitive to obstruction.

These challenges can be addressed using a radar-based localization technique. However, radar measurement techniques have difficulty in providing 360° coverage without blind spots. Notably, isotropic radiation or beam patterns (which are sometimes referred to as an 'omnidirectional antenna pattern') are often not practical or feasible. Instead, many transmit or receive antennas have non-isotropic radiation or beam patterns (which are sometimes referred to as 'directional antenna patterns'). For example, instead of field of view (FOV) from −90° to 90°, a transmit or a receive antenna may have an FOV from −70° to 70°. Moreover, when such transmit or receive antennas are arranged in arrays, there are often blind spots in the coverage.

Figure 4:
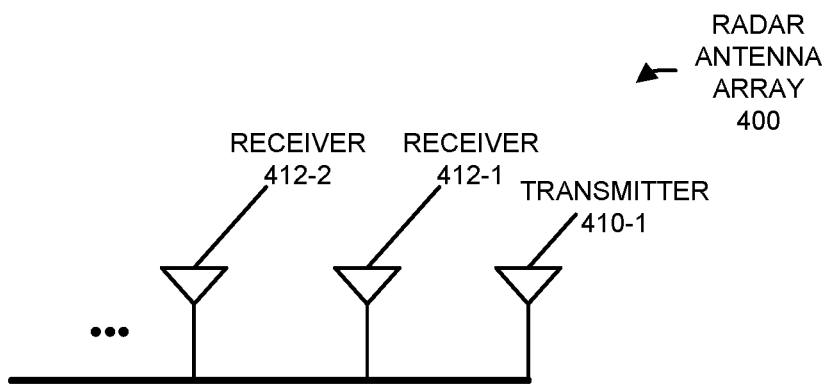
FIG. 4 is a drawing illustrating an example of a radar antenna array.

For example, as shown in FIG. 4, which presents a drawing illustrating an example of a radar antenna array 400, a linear receive antenna array with a transmitter 410-1 and multiple receivers 412 can provide good angular resolution, because all the receive antennas may be synchronized for beamforming. However, regardless of the number of receive antennas that are used, the FOV may be limited to −90° to approximately 90°. The angular ambiguity may depend on the sidelobe and grating lobe level. In general, this is less a problem in a linear receive antenna array because all the receive antennas are receiving in a limited FOV.

Figure 5:
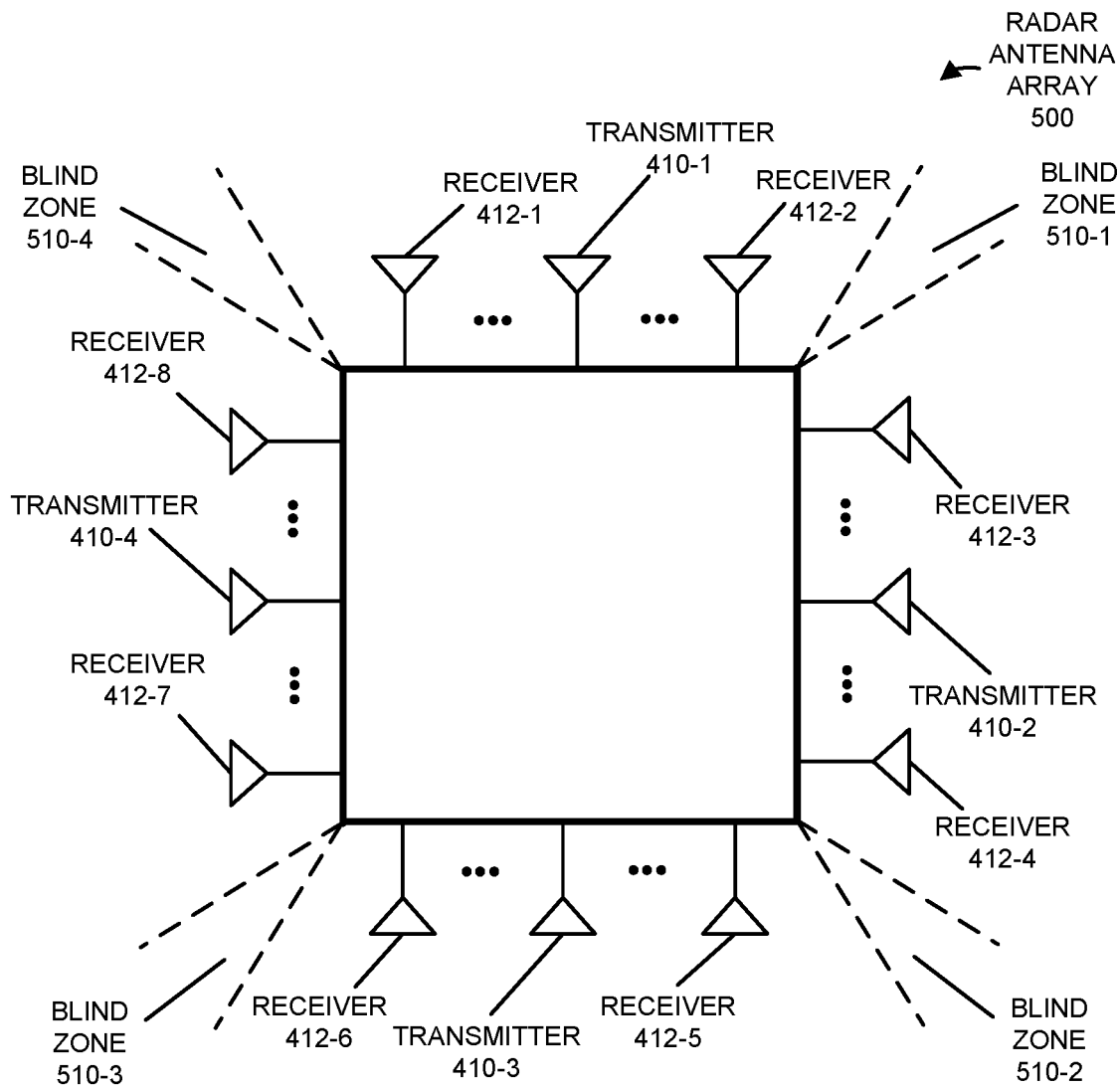
FIG. 5 is a drawing illustrating an example of a radar antenna array.

Moreover, as shown in FIG. 5, which presents a drawing illustrating an example of a radar antenna array 500, a square or polygon receive antenna array with each side having, e.g., four receive antennas may offer poorer angular ambiguity, because there are fewer receive antennas used for beamforming on each side. Furthermore, the FOV may be less than 360°, with blind zones 510 at the corners. The angular ambiguity may be more of a problem, because there are fewer receive antennas receiving in a limited FOV on each side.

In the disclosed measurement techniques, a circular beamforming system or CBS (which is sometimes referred to as a 'circular architecture') may use a circular antenna array to provide: an FOV with 360° coverage; improved angular ambiguity compared to a polygon antenna array, reduced cost by reducing the number of transceivers (which may make better use of resources, thereby reducing redundancy), and/or beamforming techniques for a circular antenna array. The proposed CBS may include a polarized antenna array that includes multiple transmit and receive antennas or antenna elements in a circular architecture (or arrangement). The transmit and receive antennas may be grouped in sectors to provide the FOV with 360° coverage.

During the measurement techniques, a radar transmitter (with at least a transmit antenna) in each sector may transmit radar signals, a radar receiver (with multiple receive antennas) in this sector may acquire or measure the reflected radar signals, and a processor may calculate beamforming coefficients that correspond to the locations of a transmit antenna and a given receive antenna. Based at least in part on the beamforming signal, the locations of the target or object may be calculated and/or provided to a location service that uses 360° detection. The disclosed CBS may be flexible, so that the total number of receive antennas in the circular architecture may be adapted or changed to provide a customized angular resolution. Alternatively or additionally, the CBS may allow different numbers of transmit antennas to provide a customized angular resolution. Note that different sectors may reuse/overlap receive antennas to provide improved angular resolution. In some embodiments, the radar transmitters transmit sequentially to reduce or eliminate interference among the radar transmitters. Furthermore, in some embodiments, radar transmitters on opposite sides of the circular architecture can transmit at the same time without interfering with each other.

The CBS may provide an FOV with 360° coverage using digital beamforming with the at least a subset of the receivers. (In contrast, existing linear or planar antenna array architectures typically cannot provide this FOV.) Moreover, the CBS may provide a predefined or consistent angular resolution, e.g., 14° (existing linear or planar antenna array architectures usually do not provide such consistency). Furthermore, the CBS may be less prone to ambiguities, such as providing a false alarm because of grating lobes. The CBS may be cost effective by using switches to couple receive antennas in receivers to a radar transceiver (because all the receive antennas may not be receiving at the same time) and all the receive antennas may be time synchronized, e.g., using a reference clock shared among them. Additionally, the CBS may be adapted or optimized by dynamically changing the number of transmitters or transmit antennas and/or receivers or receive antennas. The CBS may also adjust the positions of the transmitters or transmit antennas and/or the receivers or receive antennas around the circumference of the circular architecture to provide improved angular resolution and reduced ambiguity. By leveraging different beamforming techniques, note that the CBS may work for near-field and far-field target or object detection.

Figure 6:
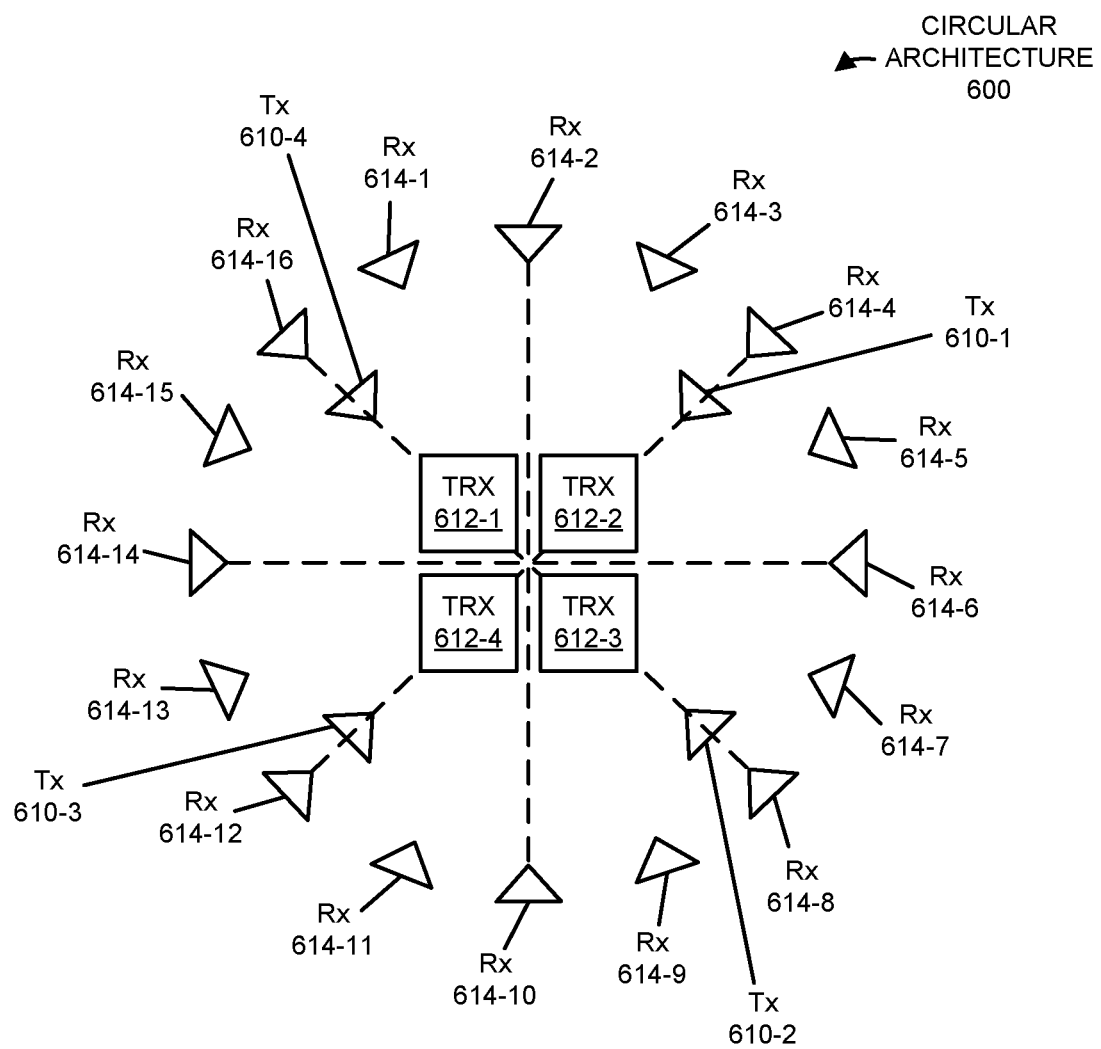
FIG. 6 is a drawing illustrating an example of a circular architecture with four radar transmitters and 16 radar receivers in the electronic device of FIG. 1.

FIG. 6 presents a drawing illustrating an example of a circular architecture 600 with four radar transmitters and 16 radar receivers in the electronic device of FIG. 1. This circular architecture may use multiple-input and multiple-output (MIMO). Notably, the radar transmitters (such as transmit antennas Tx 610 coupled to four transceivers TRX 612 may each transmit radar signals sequentially using time domain multiple access (TDMA). For example, the four radar transmitters may have duty cycles of 25%. In some embodiments, radar transmitters on opposite sides of circular architecture 600 may transmit concurrently, which may increase the duty cycle to 50%. As noted previously, if a surface is detected in the environment surrounding the electronic device, at least some of radar transmitters may be disabled. When there are four radar transmitters, this can alter the duty cycle, e.g., 25% to 33%.

In FIG. 6, different subsets of the radar receivers (such as receive antennas Rx 614 coupled to four transceivers 612) may perform radar measurements at different times. The subsets of the radar receivers may use digital beamforming during the radar measurements. Moreover, the subsets of the radar receivers may provide a consistent or predefined angular resolution, e.g., 14°.

As shown in FIG. 6, seven radar receivers may provide a FOV of 90°. For example, at a given time, transmit antenna 610-1 may transmit radar signals (while a remainder of transmit antennas 610 are idle) and receive antennas 614-1 through 614-7 may perform radar measurements. Thus, there may be one transmit antenna 610 per subset, which may transmit radar signals into a 90° sector. Moreover, there may be seven receive antennas 614 per sector, which may reuse two receive antennas 614 from neighboring sectors, e.g., on either side. (However, in some embodiments, up to eight receivers may be used.) These seven receive antennas 614 may form five beams and may provide an angular resolution of 14° with no blind zones and an FOV of 360°. The sidelobe level may be approximately 10 dB lower than the main lobe. (In contrast, the angular resolution from the rectangular planar array shown in FIG. 5 may be 35°, which may have blind zones at the corners.) Note that transmit antennas 610 and receive antennas 614 may be deployed or arranged uniformly around the circumference of circular architecture 600.

At subsequent times, e.g., four switches may be used to couple one or more of transceivers 612 to the current subset of the radar transmitters and/or the current subset of the radar receivers. In some embodiments, the number of radar transmitters and/or the number of radar receivers can be adapted based at least in part on the position or location of an object relative to a near field or a far field of transmit antennas 610 and/or receive antennas 614.

The transmit antennas 610 and the receive antennas 614 may use vertical polarization in which the electric field of the transmitted radar signals is perpendicular to the Earth's surface. In some embodiments, the transmit antennas 610 use circular polarization. Moreover, the transmit antennas 610 may have fixed antenna patterns or beampatterns. The beampatterns may be wide and flat. They are not directional antenna patterns and may have little roll off. This may help ensure that circular architecture 600 does not have any blind spots.

Figure 7:
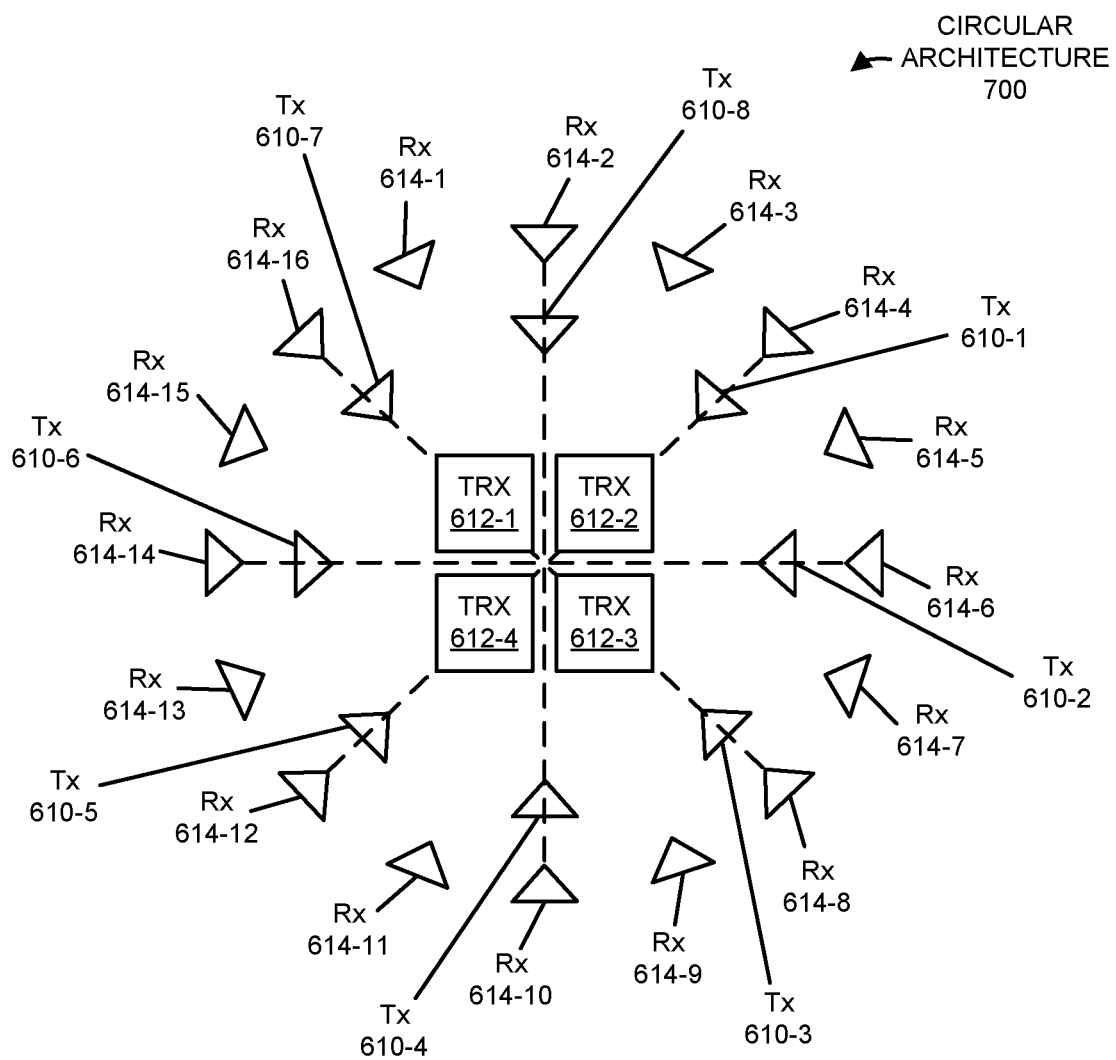
FIG. 7 is a drawing illustrating an example of a circular architecture with eight radar transmitters and 16 radar receivers in the electronic device of FIG. 1.

FIG. 7 presents a drawing illustrating an example of a circular architecture 700 with eight radar transmitters and 16 radar receivers in the electronic device of FIG. 1. This circular architecture may have better sidelobes and reduced ambiguity, but increased cost (relative to circular architecture 600 in FIG. 6). In FIG. 7, each transmit antenna 610 in the radar transmitters defines a sector, and each sector may use seven receive antennas 614 in the radar receivers for beamforming (which reuses two receive antennas 614 for neighboring sectors on either side). At a given time, note that the seven receive antennas 614 in a subset may form five beams. The angular resolution may be 14° with no blind zones and an FOV of 360°. The sidelobe level may be approximately 15 dB lower than the main lobe. Note that transmit antennas 610 and receive antennas 614 may be deployed or arranged uniformly around the circumference of circular architecture 700.

Figure 8:
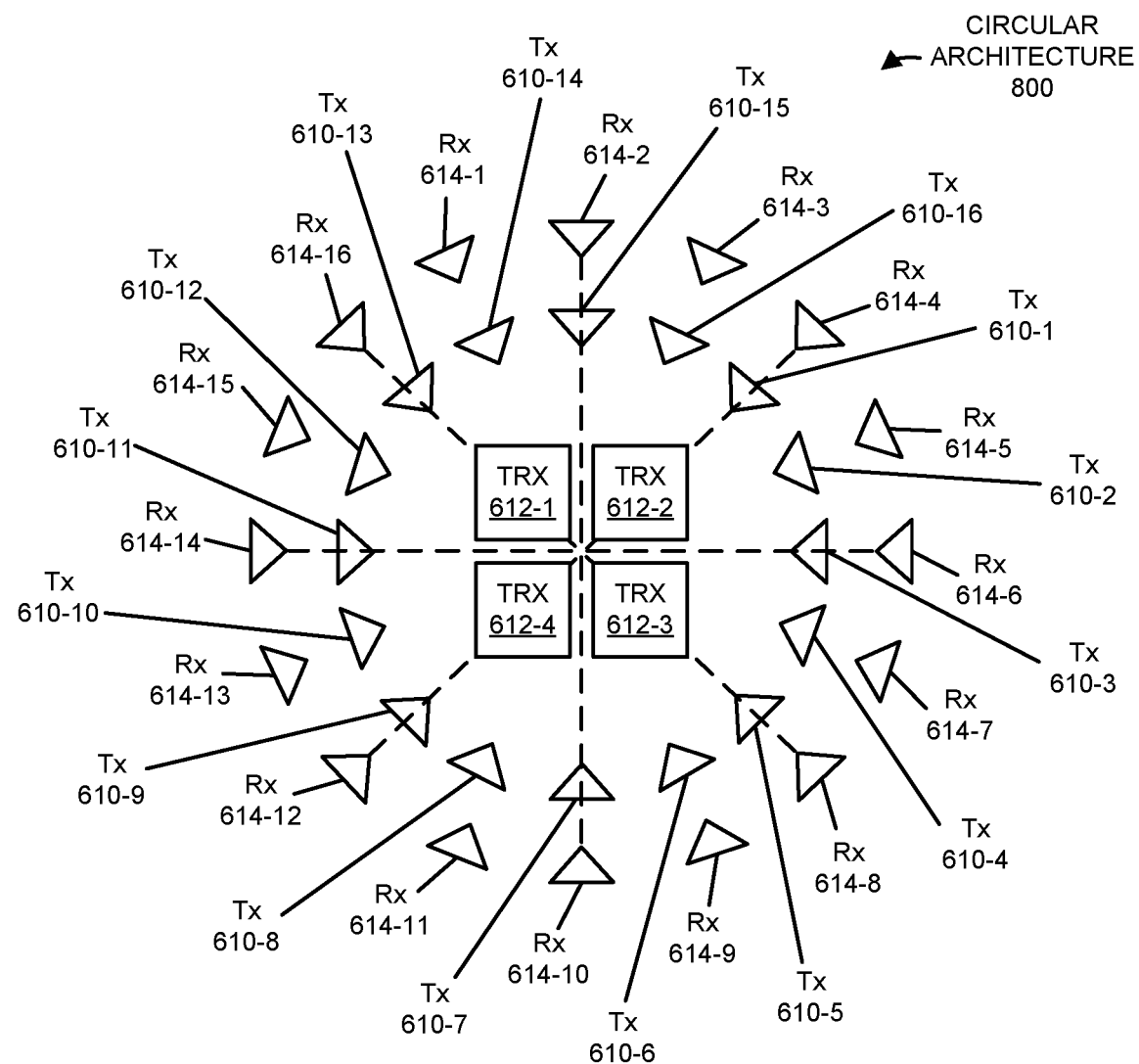
FIG. 8 is a drawing illustrating an example of a circular architecture with 16 radar transmitters and 16 radar receivers in the electronic device of FIG. 1.

FIG. 8 presents a drawing illustrating an example of a circular architecture 800 with 16 radar transmitters and 16 radar receivers in the electronic device of FIG. 1. In this circular architecture, each transmit antenna 610 in the radar transmitters defines a sector, and each sector may use seven receive antennas 614 in the radar receivers for beamforming (which reuses two receive antennas 614 for neighboring sectors, e.g., on either side). At a given time, note that the seven receive antennas 614 in a subset may form three beams. The angular resolution may be 14° with no blind zones and an FOV of 360°. The sidelobe level may be approximately 18 dB lower than the main lobe. Note that transmit antennas 610 and receive antennas 614 may be deployed or arranged uniformly around the circumference of circular architecture 800.

Table 1 summarizes the performance of circular architecture 600 (FIG. 6), circular architectures 700 (FIG. 7) and circular architectures 800 (FIG. 8). Note that when transmitters on the opposite sides of a circular architecture transmit at the same time, the duty cycle is doubled.

| Transmit Antennas/Receive Antennas | Angular Resolution (°) | Sidelobe Level (dB) | TDMA Duty Cycle (%) | Number of Beams in a Frame |
|---|---|---|---|---|
| 4/16 | 14 | −10 | 25 or 50 | 20 |
| 8/16 | 14 | −15 | 12.5 or 25 | 40 |
| 16/16 | 14 | −18 | 6.25 or 12.5 | 48 |

Figure 9:
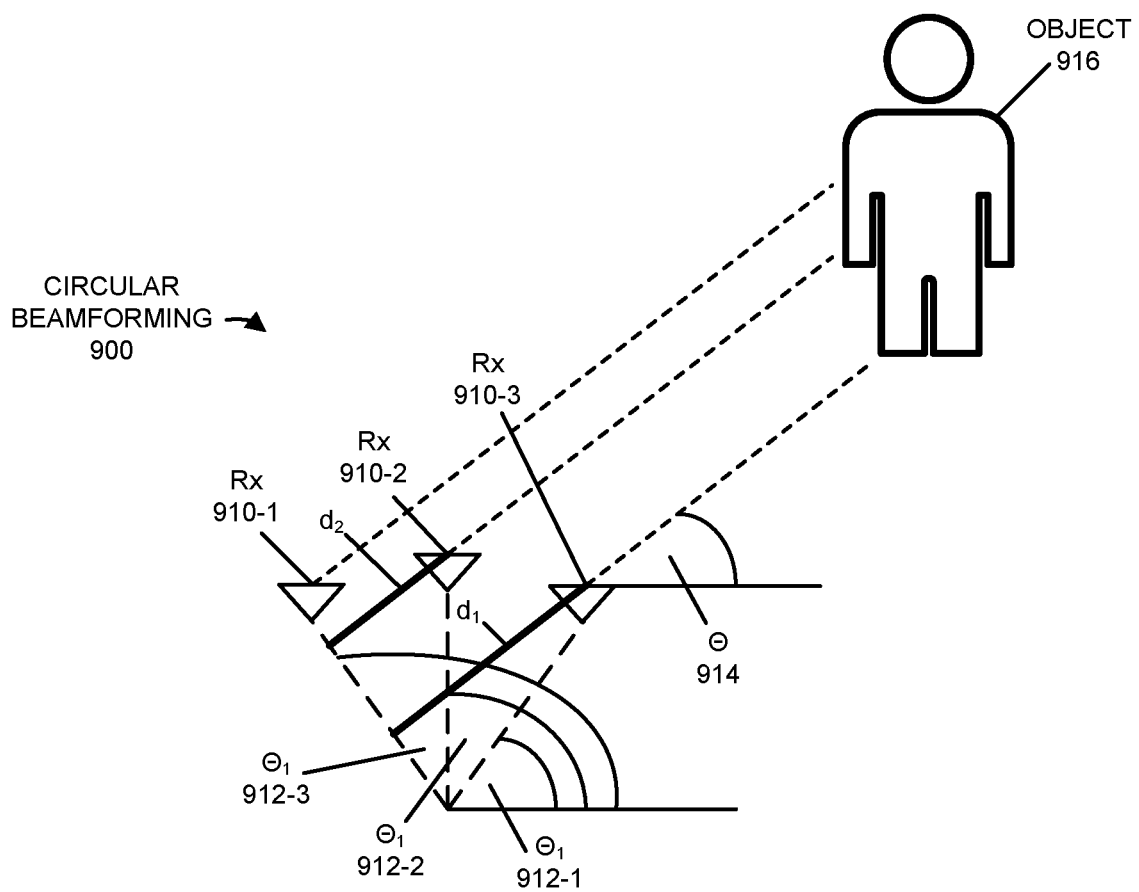
FIG. 9 is a drawing illustrating an example of circular beamforming in the electronic device of FIG. 1.

FIG. 9 presents a drawing illustrating an example of circular beamforming 900 in the electronic device of FIG. 1. Notably, circular delay-and-sum beamforming may be based on the idea that, if a uniform circular architecture is being used, then the output of each receive antenna may be the same, except that each one may be delayed by a different amount (associated with the geometry). Consequently, if the output from each of the receive antennas is appropriately delayed, then when these weight outputs are added together, the radar signal that was propagating through the circular array of receive antennas may be reinforced, while noise may cancel out.

For example, circular beamforming 900 may use three receivers (which include receive antennas 910) and weights $W_1$, $W_2$ and $W_3$. These receivers may, respectively, be located at angles $\theta_1$ 912-1, $\theta_2$ 912-2 and $\theta_3$ 912-2 and radial distance r from an origin of a circle. Moreover, the receivers may receive radar signals $Rx_1$, $Rx_2$ and $Rx_3$. Furthermore, $\theta$ 914 may be the wave incidence angle of radar signals reflected off of object 916. After calculating $d_1 = r \cdot \cos(\theta - \theta_1)$, $d_2 = r \cdot \cos(\theta - \theta_2)$ and $d_3 = r \cdot \cos(\theta - \theta_3)$, then $W_1 = \exp(j \cdot d_1 \cdot \lambda \cdot 2 \cdot \pi)$, $W_2 = \exp(j \cdot d_2 \cdot \lambda \cdot 2 \cdot \pi)$ and $W_3 = \exp(j \cdot d_3 \cdot \lambda \cdot 2 \cdot \pi)$, where $\lambda$ is the fundamental or carrier wavelength in the radar signals. Furthermore, the beamformed signal S may be computed as $S = (Rx_1 \cdot W_1 + Rx_2 \cdot W_2 + Rx_3 \cdot W_3)$.

Thus, the measurement techniques may provide seamless 360° FOV beamforming. It may not be necessary to have an isotropic radiation antenna for a 360° FOV. Moreover, the measurement techniques may provide improved angular resolution and lower grating or sidelobe rejection compared to a polygon array. Note that the direction or position of the target or object may be completely arbitrary, because there may not be a blind zone in the circular beamforming. Consequently, the target can move freely in the detection area. Furthermore, the CBS may not require that the target remain in a non-blind zone in order to be detected and tracked. Additionally, the number of receive antennas in each sector can, depending on the application, be flexible for either lower computational cost or for better angular resolution. This capability may support scalable detection and tracking of multiple targets, without adding additional antennas for every supported target. In some embodiments, in order to reduce the cost, the number of transceivers does not need to equal to number of receive antennas.

Figure 10:
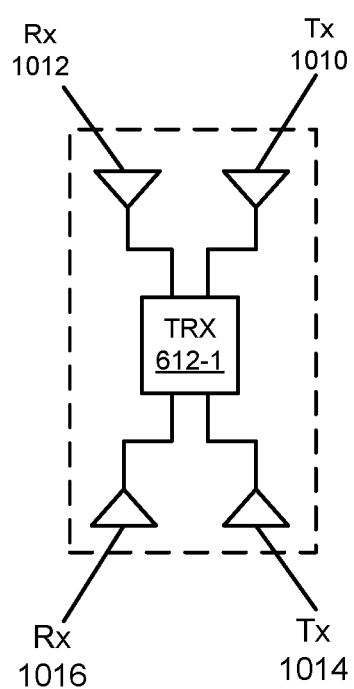
FIG. 10 is a drawing illustrating a side view of an example of an electronic device.

As shown in FIG. 10, which presents a drawing illustrating a side view of an example of an electronic device 1000, in some embodiments electronic device 1000 may include at least a top radar transmitter (which may include transmit antenna 1010) and a top radar receiver (which may include receive antenna 1012). Alternatively or additionally, electronic device 1000 may include at least a bottom radar transmitter (which may include transmit antenna 1014) and a bottom radar receiver (which may include receive antenna 1016). Respectively, the top radar transmitter and radar receiver or the bottom radar transmitter and radar receiver may have FOVs above or below electronic device 1000.

Figure 11:
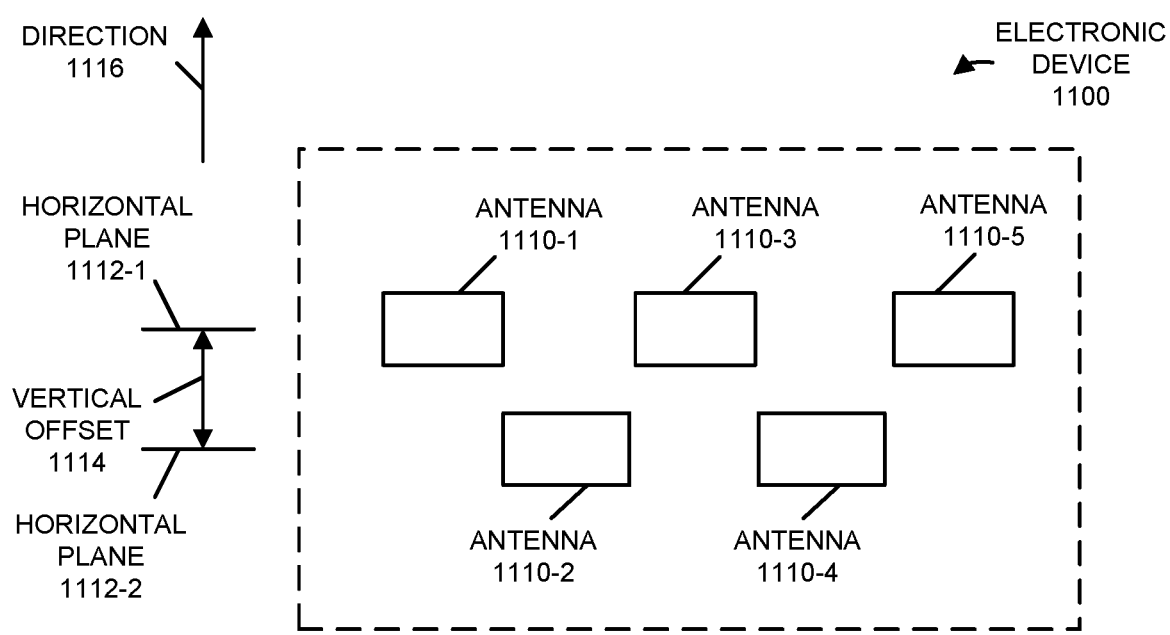
FIG. 11 is a drawing illustrating a top view of an example of an electronic device.

Moreover, as shown in FIG. 11, which presents a drawing illustrating a top view of an example of an electronic device 1100, in some embodiments, antennas 1110 (which may include transmit antennas and receive antennas) in electronic device 1100 are arranged in different horizontal planes 1112 that are vertically offset 1114 from each other. Alternatively, in some embodiments the radar transmitters and the radar receivers are arranged in a zig-zag pattern in horizontal planes 1112 to avoid near-field cross-talk and to provide information associated with vertical direction 1116.

While the preceding discussion of the measurement techniques used a circular architecture, in some embodiments two rectangular planar arrays are used. These rectangular planar arrays may be rotated, relative to each other, e.g., by 90°. Moreover, the rectangular planar arrays may be vertically offset from each other, so that they are in different horizontal planes. Note that subsets of the receivers in the rectangular planar arrays may be synchronized with each other. In addition to providing an improved FOV relative to a single rectangular planar array, this configuration or architecture may provide information associated with the vertical direction.

In summary, the measurement techniques may allow accurate, low-cost determination of the location of an object in an environment, such as an individual. Moreover, the measurement techniques may be used to identify the individual, a vital sign(s) and/or a medical condition(s) of the individual, and/or one or more parameters or properties of the object or the environment. The non-invasive radar measurements may simplify the use of the electronic device and may facilitate additional services and applications. Consequently, the measurement techniques may improve the user experience when using the electronic device.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include physical characteristics, demographic data, location-based data, telephone numbers, email addresses, Twitter ID's, home addresses (e.g., from commands), data or records relating to a user's health or level of fitness (e.g., vital signs measurements, medication information, exercise information, etc.), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. Notably, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Moreover, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Furthermore, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively limit or block the use of, or access to, personal information data. That is, the present disclosure contemplates that hardware and/or software elements can be provided to limit, prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 12 presents a block diagram of an electronic device 1200 (which may be a cellular telephone, a smartwatch, an access point, a wireless speaker, an IoT device, another electronic device, etc.) in accordance with some embodiments. This electronic device includes processing subsystem 1210, memory subsystem 1212, networking subsystem 1214 and measurement subsystem 1232. Processing subsystem 1210 includes one or more devices configured to perform computational operations. For example, processing subsystem 1210 can include one or more microprocessors, application-specific integrated circuits (ASICs), microcontrollers, graphics processing units (GPUs), programmable-logic devices, and/or one or more digital signal processors (DSPs).

Memory subsystem 1212 includes one or more devices for storing data and/or instructions for processing subsystem 1210, networking subsystem 1214 and/or measurement subsystem 1232. For example, memory subsystem 1212 can include dynamic random access memory (DRAM), static random access memory (SRAM), a read-only memory (ROM), flash memory, and/or other types of memory. In some embodiments, instructions for processing subsystem 1210 in memory subsystem 1212 include: program instructions or sets of instructions (such as program instructions 1222 or operating system 1224), which may be executed by processing subsystem 1210. For example, a ROM can store programs, utilities or processes to be executed in a non-volatile manner, and DRAM can provide volatile data storage, and may store instructions related to the operation of electronic device 1200. Note that the one or more computer programs may constitute a computer-program mechanism, a computer-readable storage medium or software. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210. In some embodiments, the one or more computer programs are distributed over a network-coupled computer system so that the one or more computer programs are stored and executed in a distributed manner.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Networking subsystem 1214 includes one or more devices configured to couple to and communicate on a wired and/or wireless network (i.e., to perform network operations), such as: control logic, an interface circuit and a set of antennas (or antenna elements) in an adaptive array that can be selectively turned on and/or off by control logic to create a variety of optional antenna patterns or 'beam patterns.' Alternatively, instead of the set of antennas, in some embodiments electronic device 1200 includes one or more nodes, e.g., a pad, which can be coupled to the set of antennas. Thus, electronic device 1200 may or may not include the set of antennas. For example, networking subsystem 1214 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi© networking system), an Ethernet networking system, and/or another networking system.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or frame frames and/or scanning for advertising frames transmitted by other electronic devices.

Measurement subsystem 1232 includes one or more devices configured to transmit radar signals and to perform radar measurements, such as: control logic 1216, multiple radar transmitters 1218 and radar receivers 1234 that are collocated in electronic device 1200, and a set of antennas 1220 (or antenna elements) that are electrically coupled to radar transmitters 1218 and radar receivers 1234 at nodes 1208 (such as, e.g., one or more pads). These radar receivers may be synchronized with each other using one or more clock signals provided by clock 1236. In some embodiments, set of antennas 1220 have a directional antenna pattern that is other than or different from an omnidirectional antenna pattern.

Within electronic device 1200, processing subsystem 1210, memory subsystem 1212, networking subsystem 1214 and measurement subsystem 1232 are coupled together using bus 1228 that facilitates data transfer between these components. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc. Display subsystem 1226 may be controlled by processing subsystem 1210 to display information to a user (e.g., information relating to incoming, outgoing, or an active communication session).

Electronic device 1200 can also include a user-input subsystem 1230 that allows a user of the electronic device 1200 to interact with electronic device 1200. For example, user-input subsystem 1230 can take a variety of forms, such as: a button, keypad, dial, touch screen, audio input interface, visual/image capture input interface, input in the form of sensor data, etc.

Electronic device 1200 can be (or can be included in) any electronic device with at least one network interface or a measurement subsystem. For example, electronic device 1200 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program instructions 1222 are included in operating system 1224 and/or control logic 1216 is included in radar transmitters 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. This integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

Alternatively or additionally, an integrated circuit (which is sometimes referred to as a 'measurement circuit') may implement some or all of the functionality of measurement subsystem 1232. This integrated circuit may include hardware and/or software mechanisms that are used for transmitting radar signals from electronic device 1200 and receiving radar signals at electronic device 1200.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the measurement techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement techniques may be implemented using program instructions 1222, operating system 1224 (such as a driver for an interface circuit in networking subsystem 1214 or for radar transmitters 1218 or radar receivers 1234 in measurement subsystem 1232) or in firmware in an interface circuit networking subsystem 1214 or in measurement subsystem 1232. Alternatively or additionally, at least some of the operations in the measurement techniques may be implemented in a physical layer, such as hardware in an interface circuit in networking subsystem 1214 or in measurement subsystem 1232. In some embodiments, the measurement techniques are implemented, at least in part, in a MAC layer and/or in a physical layer in an interface circuit in networking subsystem 1214.

While examples of numerical values are provided in the preceding discussion, in other embodiments different numerical values are used. Consequently, the numerical values provided are not intended to be limiting.

While the preceding embodiments illustrated the use of radar signals, in other embodiments of the measurement techniques electromagnetic signals in one or more different frequency bands are used to determine the location of the object. For example, these signals may be communicated in one or more bands of frequencies, including: 900 MHz, 2.4 GHz, 5 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising M separate radar transmitters and N separate radar receivers that are co-located in the electronic device, wherein the M radar transmitters and the N radar receivers are arranged in a circular architecture that provides 360° coverage in a horizontal plane,
   wherein the N radar receivers are synchronized using a clock signal; and
   wherein the electronic device is configured to:
      sequentially transmit radar signals using subsets of the M radar transmitters;
      perform radar measurements using the N radar receivers, wherein, when a given subset of the M radar transmitters is transmitting, at least a subset of the N radar receivers performs the radar measurements using circular beamforming; and
      determine a location of an object in an environment around the electronic device based at least in part on the radar measurements, wherein the location comprises a range and an angular position, and
      wherein the electronic device is configured to delay the transmitted radar signals so that a near field of the M radar transmitters is not determined by a pulse width of the transmitted radar signals.

2. The electronic device of claim 1, wherein the electronic device comprises multiple radar transceivers; and
   wherein the M radar transmitters comprise M transmit antennas that are coupled to the radar transceivers, and the N radar receivers include N receive antennas that are coupled to the radar transceivers.

3. The electronic device of claim 1, wherein the electronic device is configured to interpolate between the radar measurements performed by at least the subset of the N radar receivers, remove at least a portion of the radar measurements that are associated with one or more static objects in the environment, or both.

4. The electronic device of claim 1, wherein the electronic device is configured to dynamically adapt a number of radar receivers in at least the subset of the N radar receivers used to perform the radar measurements.

5. The electronic device of claim 1, wherein the M radar transmitters are configured to vertically polarize or circularly polarize the radar signals.

6. The electronic device of claim 1, wherein the electronic device comprises at least one of a (i) top radar transmitter and a top radar receiver or (ii) a bottom radar transmitter and a bottom radar receiver, which, respectively, have fields of view above or below the electronic device; and
   wherein the electronic device is configured to:
      transmit additional radar signals using the top radar transmitter, the bottom radar transmitter, or both;
      perform additional radar measurements using the top radar receiver, the bottom radar receiver, or both; and
      determine a vertical dimension of the environment based at least in part on the additional radar measurements.

7. The electronic device of claim 1, wherein portions of the M radar transmitters and portions of the N radar receivers may be arranged in different horizontal planes.

8. The electronic device of claim 1, wherein the electronic device is configured to:
   detect a surface proximate to the electronic device; and
   disable one or more of the M radar transmitters having fields of view that include the surface.

9. The electronic device of claim 1, wherein the delay of the transmitted radar signals corresponds to one or more internal delays of one or more electrical signals in the electronic device.

10. The electronic device of claim 1, wherein the object comprises an individual; and
    wherein the electronic device is configured to identify the individual based at least in part on the radar measurements.

11. The electronic device of claim 1, wherein the object comprises an individual; and
    wherein, based at least in part on the radar measurements, the electronic device is configured to determine at least one of: a vital sign of the individual or a medical condition of the individual.

12. The electronic device of claim 1, wherein, based at least in part on the radar measurements, the electronic device is configured to determine one of: one or more horizontal dimensions of the environment, or an orientation of the electronic device in the environment.

13. The electronic device of claim 1, wherein, based at least in part on the radar measurements, the electronic device is configured to determine one of: an acoustic property of the object in the environment or an acoustic property of the environment.

14. The electronic device of claim 1, wherein the transmitted radar signals comprise pulsed radar signals and continuous-wave radar signals.

15. The electronic device of claim 1, wherein the angular position of the object may have a predefined resolution over the 360° coverage.

16. The electronic device of claim 1, wherein the given subset of the M radar transmitters comprises one of: one radar transmitter or a pair of radar transmitters located on opposite sides of the circular architecture.

17. A non-transitory computer-readable storage medium for use in conjunction with an electronic device that comprises M separate radar transmitters and N separate radar receivers that are co-located in the electronic device, the computer-readable storage medium storing program instructions that, when executed by the electronic device, cause the electronic device to perform radar measurements by carrying out one or more operations comprising:
   sequentially transmitting radar signals using subsets of the M radar transmitters, wherein the M radar transmitters and the N radar receivers are arranged in a circular architecture that provides 360° coverage in a horizontal plane, and wherein M and N are integers;
   performing the radar measurements using the N radar receivers, wherein the N radar receivers are synchronized using a clock signal, wherein, when a given subset of the M radar transmitters is transmitting, at least a subset of the N radar receivers performs the radar measurements using circular beamforming; and
   determining a location of an object in an environment of the electronic device based at least in part on the radar measurements, wherein the location comprises a range and an angular position, and
   wherein the electronic device delays the transmitted radar signals so that a near field of the M radar transmitters is not determined by a pulse width of the transmitted radar signals.

18. The computer-readable storage medium of claim 17, wherein the one or more operations comprise dynamically adapting a number of radar receivers in at least the subset of the N radar receivers used to perform the radar measurements.

19. A method for performing radar measurements, comprising:
   by an electronic device that comprises M separate radar transmitter and N separate radar receivers that are co-located in the electronic device:
      sequentially transmitting radar signals using subsets of the M radar transmitters, wherein the M radar transmitters and the N radar receivers are arranged in a circular architecture that provides 360° coverage in a horizontal plane, and wherein M and N are integers;
      performing the radar measurements using the N radar receivers, wherein the N radar receivers are synchronized using a clock signal, wherein, when a given subset of the M radar transmitters is transmitting, at least a subset of the N radar receivers performs the radar measurements; and
      determining a location of an object in an environment around the electronic device based at least in part on the radar measurements, wherein the location comprises a range and an angular position, and
      wherein the electronic device delays the transmitted radar signals so that a near field of the M radar transmitters is not determined by a pulse width of the transmitted radar signals.

20. The method of claim 19, wherein the object comprises an individual; and
   wherein the method comprises identifying the individual based at least in part on the radar measurements.

* * * * *